(No Model.) 2 Sheets—Sheet 1.

G. M. ANDERSSON.
CENTRIFUGAL BUTTER EXTRACTOR.

No. 519,691. Patented May 15, 1894.

Witnesses
Geo. W. Breck
C. E. Ashley

Gustaf M. Andersson
Inventor
By his Attorneys
Witter & Kenyon (No Model.) 2 Sheets—Sheet 2.
G. M. ANDERSSON.
CENTRIFUGAL BUTTER EXTRACTOR.
No. 519,691. Patented May 15, 1894.
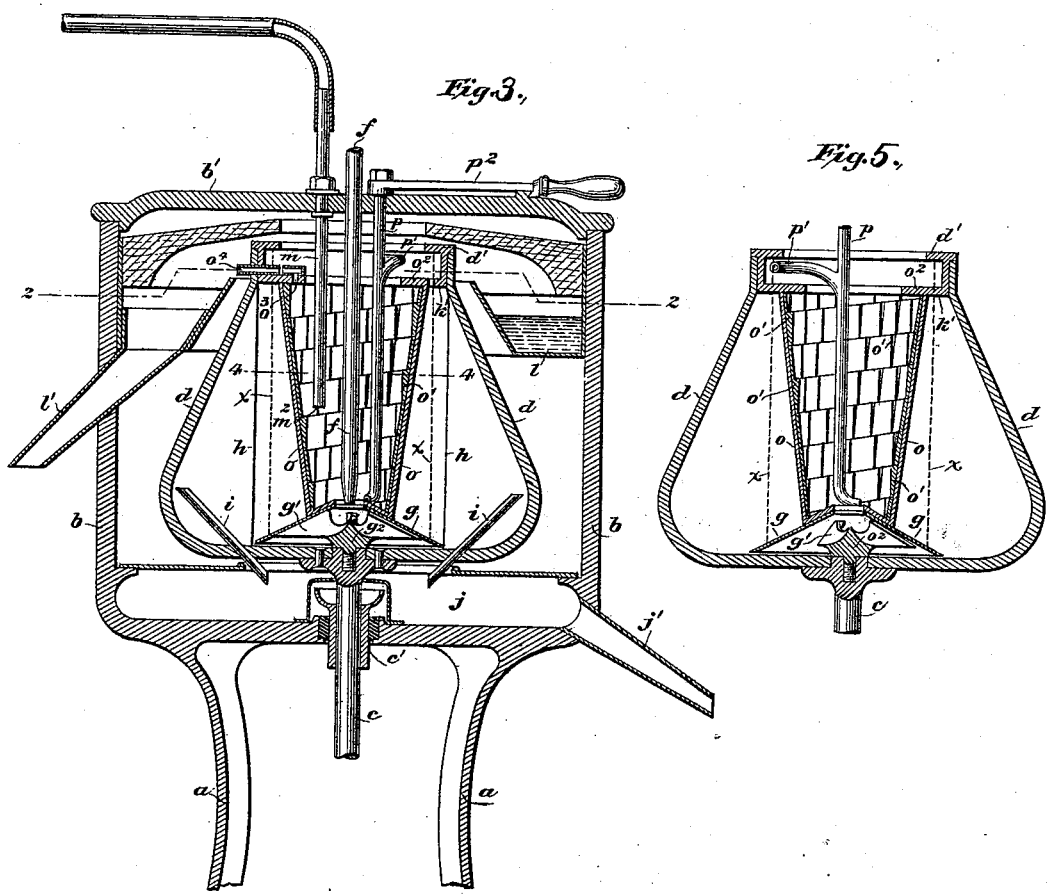
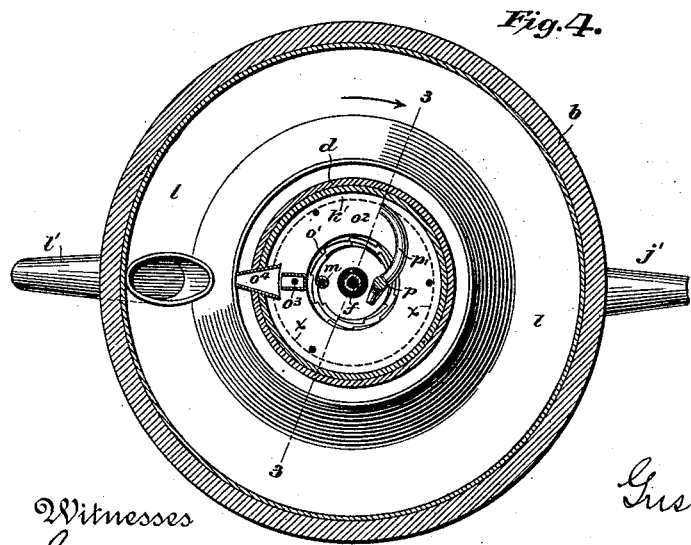
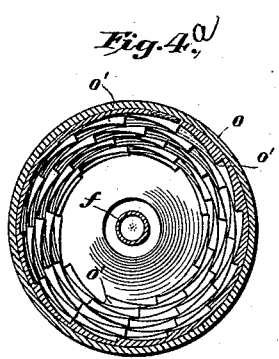
Witnesses
Geo. W. Breck
C. E. Ashley
Gustaf M. Andersson
Inventor
By his Attorneys
Witter & Kenyon

UNITED STATES PATENT OFFICE.

GUSTAF M. ANDERSSON, OF NEWARK, NEW JERSEY, ASSIGNOR TO THE UNITED STATES BUTTER EXTRACTOR COMPANY, OF NEW YORK, N. Y.

CENTRIFUGAL BUTTER-EXTRACTOR.

SPECIFICATION forming part of Letters Patent No. 519,691, dated May 15, 1894.

Application filed August 28, 1890. Serial No. 363,364. (No model.)

*To all whom it may concern:*

Be it known that I, GUSTAF M. ANDERSSON, a subject of the King of Sweden and Norway, and a resident of Newark, county of Essex, State of New Jersey, have invented certain new and useful Improvements in Centrifugal Butter-Extracting Apparatus, of which the following is a specification, reference being had to the accompanying drawings, which form a part hereof.

This invention relates to centrifugal apparatus to be employed in extracting butter from milk or cream.

The object of the invention is to provide an improved apparatus for dividing or separating or disturbing the cream or thick milk so as to cause the particles of butter fat to coalesce and form palpable masses of butter.

The invention consists of a new centrifugal cream disturber or butter separator consisting of obstacles spirally arranged against which obstacles the cream works and whereby the particles of butter fat are separated from the particles of blue milk and the particles of butter fat caused to coalesce and form palpable masses of butter. These spiral obstacles may be arranged as steps or ridges and at successively increasing distances from the axis of revolution. They may be arranged cylindrically, conically or flat.

When my entire invention is used the spiral obstacles are arranged on a substantially flat surface and the cream is caused to traverse a spiral path and over steps arranged along spiral walls and is thereby worked and the butter separated.

My entire invention also includes the combination of the butter separator with a cream separator, the butter separator being connected to and arranged to revolve with the cream separator and to receive separated cream from the cream wall formed by centrifugal action in such cream separator.

Figure 2:
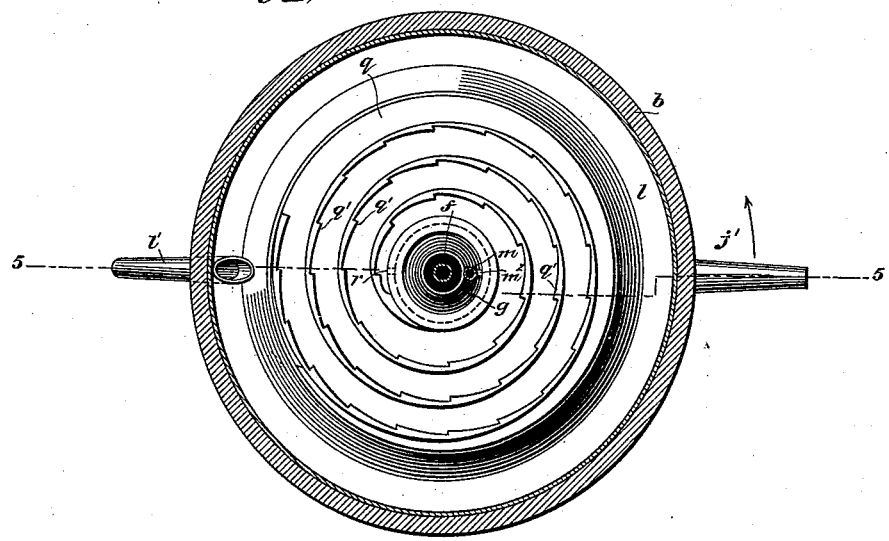
Figure 1:
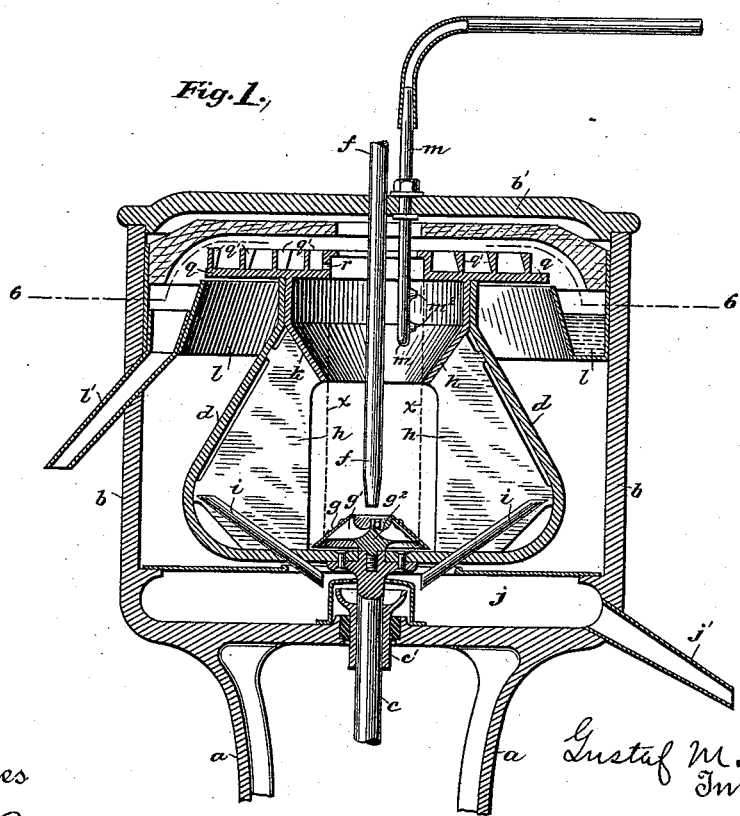

In the accompanying drawings Figure 1 is a vertical section on the line 5—5, Fig. 2, of a cream separator and butter separator containing my complete invention, and Fig. 2 is a horizontal section of the same on the line 6—6, Fig. 1. Figs. 3, 4, $4^a$ and 5 show a modified construction of the same. Fig. 3 is a vertical central section. Fig. 4 is a horizontal section on the line 2—2, Fig. 3. Fig. $4^a$ is an enlarged horizontal section of the butter separator on the line 4—4, Fig. 3. Fig. 5 is a vertical section of the centrifugal drum on the line 3—3, Fig. 4.

The frame of the apparatus consists of the fixed casing $b$, provided with a removable cover $b'$, and supported by a suitable base $a$ of ordinary construction, the upper portion only of which is shown. The operating shaft $c$ is arranged vertically and rotatively mounted in bearings of the usual construction. The upper bearing $c'$ is shown in Fig. 1. Its upper part is covered by a cap secured to the casing $b$. The separating drum $d$ is securely fixed upon the upper end of the operating shaft $c$. In the operation of the apparatus this drum is revolved at a rate of from six thousand to eight thousand revolutions per minute.

The milk or cream is supplied preferably in a continuous but regulated stream, through the tube $f$, which is stationary and extends downward to the lower part of the drum. A spread cup of the construction shown and claimed in Letters Patent granted to me December 6, 1892, No. 487,316, application filed June 30, 1890, under Serial No. 357,307, is arranged at the bottom of the drum adjacent to the mouth of the tube $f$. This spread cup comprises an inclined partition $g$, supported just above the bottom of the drum with an opening all around between the lower edge of the partition and the bottom of the drum, radial ribs or blades $g'$ for imparting rotation to the fluid passing through the spread cup, and a central spreader $g^2$. The milk or cream passes down from the mouth of the feed tube $f$, to the spreader $g^2$, and is then thrown outward and revolved by the blades $g'$, and passes under the partition $g$, and out toward the periphery of the drum $d$. Radial blades $h$ are provided in the drum $d$, to compel the liquid to partake of the revolution of the drum. The intense centrifugal force resulting from the rapid revolution of the drum causes a separation of the particles of the fluid and a re-arrangement of these particles according to their specific gravities, so that the heavy blue milk is near the periphery of the drum and the light cream is nearest the center or axis. The inner periphery of the cream wall will be about in the position indicated by the dotted lines $x$. An inclined inwardly extending partition $k$ is formed in the upper part of the centrifugal drum $d$ similar to the partition shown and claimed in my application above referred to, filed June 30, 1890, Serial No. 357,307. The inner edge or lip of this partition is located in the cream wall of the drum, and the separated cream rises above this partition $k$. The top of the drum has a large circular opening, the wall of which is of about the same diameter as that of the inner lip of the partition $k$, and in the side of this large opening, the small passage or opening $r$ is formed whereby the cream passes into the cream disturber or butter separator. An inwardly extending flange overhangs this large opening and prevents the escape of the cream otherwise than through the passage $r$. The outlet for the blue milk is provided by the two inclined tubes $i$, extending from points within the drum near the outer wall of the drum, downwardly and out of the drum. A receiver $j$ is formed in the bottom of the casing $b$, into which the blue milk passes from the mouths of the tubes $i$, and a spout $j'$ leads from this receiver out of the apparatus.

When my entire invention is used, as shown in Figs. 1 and 2, the centrifugal cream disturber or butter separator is mounted upon the top of the drum. It consists of a flat disk $q$ having a vertical wall extending up from the same, such wall winding around the disk $q$ in a spiral line. The inner face of this spiral wall has steps or projections $q'$ formed upon it throughout its length. The spiral passage or groove between adjacent parts of the wall forms a spiral passage or path for the cream or butter. The separated cream flows through the passage $r$ and into this spiral groove, and passes outward from the center through such groove. The intense centrifugal force presses it against the toothed or stepped surface of the wall so that in thus passing outward it is thrown from step to step and agitated and worked, and by this agitation the butter fat globules are separated from the blue milk and are caused to coalesce and adhere together and form palpable masses of butter. The butter finally escapes from the separator at the outer end of the spiral wall and is thrown into the butter receiver $l$. This butter receiver $l$ is fixed in the upper part of the casing, and has a spout $l'$ which conveys the butter out of the apparatus.

In the modified construction shown in Figs. 3, 4, 4ª and 5 the centrifugal cream separating drum is substantially of the same construction as that heretofore described, but in place of the inclined partition $k$ I provide a flat annular shelf consisting of an outer rim $k'$, which forms a partition in the drum, and an inner rim $o^2$, which extends over the butter separator. The butter separator or cream disturber is arranged within the drum and consists of a conical tube $o$, provided interiorly with a series of spirally arranged steps $o'$, $o'$. The lower and smaller end of the conical tube $o$ is fitted upon the inclined partition $g$, and is partly closed but provided with an opening for the passage of the feed tube $f$. The steps $o'$ are arranged at successively increasing distances from the axis of revolution and in successively higher planes on a spiral line winding conically around, upward and away from the axis of revolution. This conical and spiral cream disturber or butter separator may be readily constructed by forming the steps $o'$ in a straight metallic strip, and then winding such strip spirally within the conical tube $o$. The steps $o'$ are preferably shaped of tapering form, with their greatest projection at the corner of the tooth which is uppermost. The top of the conical tube $o$ is a short distance below the top of the drum $d$, in line with the annular shelf formed of the outer rim $k'$, and the inner rim $o^2$. The inner rim $o^2$ extends over the cream disturber and prevents escape of butter therefrom except at the proper passages. An annular chamber is formed between the top of the butter separator and the top of the drum, that is to say, between the partition $k'$ and the annular inwardly extending rim $d'$ at the top of the drum. The partition $k$ is provided with perforations or passages arranged just inside the cream wall. The cream flows up through these passages and into the annular chamber at the top of the drum, and forms a cream wall in such chamber which is virtually part of the cream wall of the drum. A conduit $p$ is provided for conveying the cream from this upper cream wall of the drum to the bottom of the butter separator, and is rotatively fitted in the cover $b'$ of the casing of the apparatus, and has a curved projecting arm or scoop $p'$, which extends into the upper cream wall above the partition $k'$, and is curved at its lower end, and has a continuous passage extending from the end of the arm $p'$ to the curved lower end of the conduit. An arm $p^2$ is secured to the upper end of the conduit $p$, outside the casing, and is provided with a clamping handle. The manipulation of this arm will adjust the position of the scoop arm $p'$ in relation to the cream wall. The cream passes through the arm $p'$ and downward and out through the curved lower end of the conduit and is thrown with considerable force against the lower end of the butter separator. A high velocity is thus imparted to the cream, and the intense centrifugal force is tending to move it away from the axis of revolution. The cream will therefore be pressed against the interior walls of the butter separator and against the steps $o'$ of such walls, and will rise upward in such butter separator, following quite closely the spiral form of the steps, and will thus be considerably agitated and thrown from step to step. This agitation will cause the butter fat globules to separate and coalesce and form palpable masses of butter. The separated butter will eventually pass through the opening $o^3$ in the rim $o^2$ and then radially outward through the passage $o^4$, and finally into the butter receiver $l$.

A fluid supply device is usually provided to afford a supply of lubricating and temperature regulating fluid, such as water, brine or milk, to the butter separator. This fluid supply device consists of a pipe $m$, held in the top $b'$ of the casing and extending downward and provided with one or more nozzles $m^2$. In Figs. 1 and 2 this fluid supply duct extends into the separating drum, and is provided with nozzles $m^2$, $m^2$, arranged just below the inner edge of the top of the drum. In Figs. 3, 4, 4ª and 5 it extends downward inside of the butter separator and has a single nozzle $m^2$ at its lower end.

The modified construction shown in Figs. 3, 4, 4ª and 5 is claimed in a separate application filed by me April 1, 1891, under Serial No. 387,202, and is therefore not claimed herein.

It is evident that my broad invention is capable of many modifications, and that parts of my complete invention may be separately used. The cream disturber or butter separator may be used without the drum or with a drum of different construction.

The fluid supply device and the spread cup shown herein are claimed in my above mentioned patent, No. 487,316, issued December 6, 1892, and are therefore not claimed herein.

What I claim is—

1. In a centrifugal butter extracting apparatus, the combination with means for imparting rotation to the milk or cream, of a butter separator consisting of obstacles spirally arranged, substantially as set forth.

2. In a centrifugal butter extracting apparatus, a centrifugal butter separator fitted to rotate and consisting of obstacles spirally arranged, and means for revolving the butter separator, substantially as set forth.

3. In a centrifugal butter extracting apparatus, the combination of a centrifugal cream separator and means for revolving it, with a butter separator connected to and arranged to revolve with the cream separator and consisting of obstacles spirally arranged about the axis of revolution, substantially as set forth.

4. A centrifugal butter separator consisting of a spirally shaped wall provided with ridges or steps on its inner face, in combination with means for imparting rotation to the milk or cream, substantially as set forth.

5. In a centrifugal butter extractor, the combination of a cream separating drum and means for revolving it, with a butter separator connected to the drum and arranged to revolve with the drum and to receive the cream from the inner cream wall of the drum, and consisting of a spirally shaped wall provided with ridges or steps on its inner face, substantially as set forth.

6. The centrifugal butter separator consisting of the disk $q$ and the spirally shaped wall on such disk provided with steps $q'$, and means for revolving the same, substantially as set forth.

7. The centrifugal butter extractor, consisting of a cream separating drum and means for revolving it, in combination with the disk $q$ mounted upon such drum, the passage $r$ arranged to receive the separated cream from such drum, and the spirally shaped wall on the disk $q$, provided with steps $q'$, substantially as set forth.

8. A churning attachment for a centrifugal vessel having a passage-way to receive the continuously separated cream and means for agitating the cream located in said way, whereby the butter fat is developed in the cream during its centrifugal flow toward the outlet from said way, substantially as set forth.

9. In a centrifugal machine, a separator vessel provided with a churning receptacle having a passage way to receive the continuously separated cream and means for agitating the cream located in said way, whereby the butter-fat is developed in the cream during the centrifugal flow toward the outlet from said way, substantially as set forth.

GUSTAF M. ANDERSSON.

Witnesses:
   EDWIN SEGER,
   WILLIAM G. WEINBERG.